(12) United States Patent
Kinoshita et al.

(10) Patent No.: US 9,670,431 B2
(45) Date of Patent: Jun. 6, 2017

(54) INDIRECT HEAT DRYING METHOD FOR PARTICULATE MATTER, REFINED-COAL PRODUCTION METHOD, INDIRECT HEAT DRYING DEVICE, AND REFINED-COAL PRODUCTION DEVICE

(71) Applicant: Kobe Steel, Ltd., Kobe-shi (JP)

(72) Inventors: Shigeru Kinoshita, Takasago (JP); Yoichi Takahashi, Takasago (JP); Hiroki Watanabe, Kobe (JP); Shinichi Katsushima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 138 days.

(21) Appl. No.: 14/423,858

(22) PCT Filed: Sep. 18, 2013

(86) PCT No.: PCT/JP2013/075200
§ 371 (c)(1),
(2) Date: Feb. 25, 2015

(87) PCT Pub. No.: WO2014/077028
PCT Pub. Date: May 22, 2014

(65) Prior Publication Data
US 2015/0218476 A1 Aug. 6, 2015

(30) Foreign Application Priority Data

Nov. 16, 2012 (JP) .................................. 2012-252616

(51) Int. Cl.
*C10L 5/04* (2006.01)
*F26B 5/08* (2006.01)
(Continued)

(52) U.S. Cl.
CPC ....... *C10L 5/04* (2013.01); *C10L 9/08* (2013.01); *F26B 5/08* (2013.01); *F26B 11/02* (2013.01);
(Continued)

(58) Field of Classification Search
USPC .................................. 34/480, 82; 44/620, 629
See application file for complete search history.

(56) References Cited

U.S. PATENT DOCUMENTS

| 5,556,436 A | 9/1996 | Yagaki et al. |
| 2010/0077658 A1 | 4/2010 | Sugita et al. |

(Continued)

FOREIGN PATENT DOCUMENTS

| CN | 100400996 C | 7/2008 |
| CN | 101828089 A | 9/2010 |

(Continued)

OTHER PUBLICATIONS

Extended Search Report issued May 3, 2016 in European Patent Application No. 13855514.9.

(Continued)

*Primary Examiner* — Ellen McAvoy
*Assistant Examiner* — Chantel Graham
(74) *Attorney, Agent, or Firm* — Oblon, McClelland, Maier & Neustadt, L.L.P.

(57) ABSTRACT

The purpose of the present invention is to provide an indirect heat drying method and a refined-coal production method, with which the stability of carrier-gas pressure balance can be improved when using indirect heat dryers to dry particulate matter. This indirect heat drying method for particulate matter uses two indirect heat dryers, and is provided with: a step (A) in which particulate matter is dried in a first indirect heat dryer; and a step (B) in which the particulate matter is further dried in a second indirect heat dryer to obtain dried particulate matter. The indirect heat drying method for particulate matter is characterized by being further provided with a step (C) in which first microparticles included in a carrier gas discharged from the first indirect heat dryer are recovered and mixed with the particulate matter supplied to (Continued)

step (B); and a step (D) in which second microparticles included in a carrier gas discharged from the second indirect heat dryer are recovered and mixed with the dried particulate matter obtained in step (B).

8 Claims, 3 Drawing Sheets

(51) Int. Cl.
*F26B 11/02* (2006.01)
*C10L 9/08* (2006.01)
*F26B 21/00* (2006.01)

(52) U.S. Cl.
CPC ........ *F26B 21/002* (2013.01); *C10L 2290/06* (2013.01); *C10L 2290/08* (2013.01); *C10L 2290/145* (2013.01); *C10L 2290/24* (2013.01); *C10L 2290/50* (2013.01); *F26B 2200/00* (2013.01); *Y02P 70/40* (2015.11)

(56) References Cited

U.S. PATENT DOCUMENTS

| | | |
|---|---|---|
| 2011/0041393 A1 | 2/2011 | Sugita et al. |
| 2012/0079763 A1 | 4/2012 | Sugita et al. |

FOREIGN PATENT DOCUMENTS

| | | |
|---|---|---|
| CN | 102183133 A | 9/2011 |
| JP | 7-233383 A | 9/1995 |
| JP | 2005-125130 A | 5/2005 |
| JP | 2009-097783 A | 5/2009 |
| JP | 2010-214314 A | 9/2010 |

OTHER PUBLICATIONS

International Search Report and Written Opinion issued Nov. 5, 2013 in PCT/JP2013/075200 Filed Sep. 18, 2013.

INDIRECT HEAT DRYING METHOD FOR PARTICULATE MATTER, REFINED-COAL PRODUCTION METHOD, INDIRECT HEAT DRYING DEVICE, AND REFINED-COAL PRODUCTION DEVICE

TECHNICAL FIELD

The present invention relates to an indirect heat drying method for a particulate matter, a refined-coal production method, an indirect heat drying device, and a refined-coal production device.

BACKGROUND ART

A porous coal high in water content by percentage is low in calorific value. Thus, developments have been made about a method for yielding refined-coal from such a porous coal (see JP 07-233383 A). This production method is described herein. Initially, porous coal (raw coal) is pulverized into a particulate form. Thereafter, the particles are mixed with a heavy oil component and a solvent oil component to yield a raw material slurry. Next, the raw material slurry is preheated and then heated to advance the dehydration of the porous coal, and further the inside of pores in the porous coal is impregnated with a mixed oil to yield a dehydrated slurry. Thereafter, from the dehydrated slurry, a porous refined-coal and the mixed oil are separated, and then the porous refined-coal is dried (liquid-removed). The dried porous refined-coal is cooled and formed into a shape if desired. The mixed oil recovered at the time of the separation thereof from the dehydrated slurry or the drying is reused as a circulating oil to be again used for a raw material slurry.

In this refined-coal production method, the drying of the particulate porous refined-coal separated from the dehydrated slurry is usually attained by an indirect heat drying unit. As this indirect heat drying unit, the so-called steam tube drier is frequently used from the viewpoint of drying power and operability. This steam tube drier has a rotary cylinder located to be freely rotatable around an axis, plural heating tubes arranged inside the rotary cylinder to be parallel with the axis, and a carrier gas passing means for supplying a carrier gas from one out of two sides of the rotary cylinder to be discharged into the other side. As a method for drying a particulate matter, using such an indirect heat drying unit, suggested is a method of using two indirect heat drying units, supplying a carrier gas into first one of the indirect heat drying units to produce a co-current flow relative to the flow of the particulate matter, thereby drying the particulate matter, and next supplying the carrier gas into second one of the units to produce a counterflow against the flow of the particulate matter to dry the particulate matter further (see JP 2009-97783 A). The document states that such a use of two indirect heat drying units makes it possible to restrain the particulate matter from adhering onto the heating tubes, so as to yield a dried matter having a stable liquid content by percentage. Furthermore, in this drying method, for collecting dust in the carrier gas discharged from the first indirect heat drying unit, a first bug filter is used, and for collecting dust in the carrier gas discharged from the second indirect heat drying unit, a second bug filter is used. The respective dusts (fine particles) collected therein are mixed with a dried matter (particulate matter) discharged from the first indirect heat drying unit, and then the mixture is dried in the second indirect heat drying unit.

In this way, the collected dust is again dried to be made into a dried matter, whereby the resultant product (dried matter) is improved in yield. However, particularly, in the second indirect heat drying unit, for drying the particulate matter that has been dried to some degree, fine particles accompanying the carrier gas are increased. Consequently, the accumulation of the dust (the fine particles) into the second bug filter increases a loss in the pressure inside the bug filter, so that the balance between the pressures of the carrier gas is disturbed to hinder a stable driving of the processing, or to shorten the filter lifespan of the second bug filter. Moreover, the disturbance of carrier gas pressure balance causes the pressure inside the system to be partially changed to a negative pressure. Thus, the air is incorporated into the system to raise the concentration of oxygen, so that the dried matter may unfavorably ignite.

In the meantime, about the refined-coal yielded through the above-mentioned production method, dust is easily generated therefrom by the presence of the dried fine particles. Thus, for example, water is sprayed onto the resultant refined-coal. However, a large quantity of water is required. Moreover, the spray of the water causes an inconvenience of lowering the calorie value.

Patent Literature 1: JP 07-233383 A
Patent Literature 2: JP 2009-97783 A

Technical Problem

In light of the above-mentioned situation, the present invention has been made. An object thereof is to provide an indirect heat drying method and a refined-coal production method in each of which at the time of using an indirect heat drying unit to dry a particulate matter, the balance between pressures of a carrier gas can be heightened in stability. Another object thereof is to provide an indirect heat drying device and a refined-coal production device that can each attain this drying method and this production method.

Solution to Problem

An invention that has been made to solve the above-mentioned problems is an indirect heat drying method for a particulate matter, using two indirect heat drying units each comprising a rotary cylinder located to be freely rotatable around an axis, plural heating tubes arranged inside the rotary cylinder to be parallel with the axis, and a carrier gas passing means that supplies a carrier gas from one out of two sides of the rotary cylinder to be discharged into the other side, the method comprising:

step (A) of supplying the carrier gas into first one of the indirect heat drying units to produce a co-current flow relative to the flow of the particulate matter, thereby drying the particulate matter, and step (B) of supplying the carrier gas into second one of the indirect heat drying units to produce a counterflow against the flow of the particulate matter, thereby drying the particulate matter further, and the method further comprising:

step (C) of recovering first fine particles contained in the carrier gas discharged from the first indirect heat drying unit, and mixing the first fine particles with the particulate matter to be supplied to step (B), and step (D) of recovering second fine particles contained in the carrier gas discharged from the second indirect heat drying unit, and mixing the second fine particles with the dried particulate matter yielded through step (B).

According to this indirect heat drying method for a particulate matter, in step (D), the second fine particles contained in the carrier gas discharged from the second indirect heat drying unit is mixed with the dried particulate matter yielded through step (B) without being again supplied into the second indirect heat drying unit to be dried. This manner makes it possible to decrease the amount of the second fine particles contained in the carrier gas discharged from the second indirect heat drying unit and decrease the amount of the second fine particles accumulating into a bug filter or some other that is used to recover the second fine particles. Thus, this indirect heat drying method makes it possible to heighten the stability of the balance between pressures of the carrier gas. Moreover, the second fine particles are particles which are relatively small in particle diameter, out of particles of the particulate matter to be dried, and which have been sufficiently dried; thus, this indirect heat drying method is not substantially lowered in drying efficiency, as compared with conventional drying methods.

Furthermore, this indirect heat drying method makes it possible to treat only the once-separated second fine particles, and mix the treated second fine particles with the dried particulate matter yielded through step (B). Examples of this treatment include the spraying of water onto the second fine particles, and the blend of an adhesive with the particles. This treatment makes it possible to restrain dust effectively from being generated from the dried particulate matter, and heighten the particulate matter in formability when the matter is shaped into a briquette form.

The second fine particles recovered through step (D) preferably have an average particle diameter of 10 μm or less. Since the fine particles having such a particle diameter have been relatively sufficiently dried in step (A), the drying efficiency in the present indirect heat drying method can be restrained from being lowered. Moreover, especially fine particles having a particle diameter in this range easily cause the bug filter to be clogged or damaged into some other form; therefore, by recovering these fine particles, the carrier gas pressure balance can be made higher in stability.

The ratio by mass of the second fine particles recovered in step (D) to the dried particulate matter yielded through step (B) is preferably from 1/99 to 1/3 both inclusive. By separating the second fine particles the proportion of which is in this range, the carrier gas pressure balance can be made higher in stability, and simultaneously the drying efficiency can be restrained from being lowered.

The refined-coal production method of the present invention is a refined-coal production method, comprising:

step (α) of mixing particulate porous coal with an oil to yield a raw material slurry, step (β) of heating the raw material slurry to yield a dehydrated slurry, step (γ) of separating the dehydrated slurry into a porous refined-coal and an oil, and step (δ) of drying the separated porous refined-coal, wherein in step (δ), the present indirect heat drying method for a particulate matter is used.

According to this refined-coal production method, the present indirect heat drying method for a particulate matter is used to dry porous refined-coal. Thus, the method makes it possible to heighten the carrier gas pressure balance in stability to heighten the refined-coal in productivity.

The indirect heat drying device of the present invention has:

a first indirect heat drying unit and a second indirect heat drying unit, each of the indirect heat drying units comprising a rotary cylinder located to be freely rotatable around an axis, plural heating tubes arranged inside the rotary cylinder to be parallel with the axis, and a carrier gas passing means that supplies a carrier gas from one out of two sides of the rotary cylinder to be discharged into the other side, the indirect heat drying device being arranged to receive a dried matter yielded from the first indirect heat drying unit as a matter to be dried in the second indirect heat drying unit, and the carrier gas passing means being a means that supplies the carrier gas into the first indirect heat drying unit to produce a co-current flow relative to the flow of a matter to be dried in the first indirect heat drying unit, and that supplies the carrier gas into the second indirect heat drying unit to produce a counterflow against the flow of the matter to be dried in the second indirect heat drying unit;

the drying device further having:

a first recovering means that recovers first fine particles contained in the carrier gas discharged from the first indirect heat drying unit, a first mixing means that mixes the first fine particles with a particulate matter to be supplied into the second indirect heat drying unit, a recovering means that recovers second fine particles contained in the carrier gas discharged from the second indirect heat drying unit, and a second mixing means that mixes the second fine particles with a dried matter yielded from the second indirect heat drying unit.

The use of this indirect heat drying device makes it possible to attain the indirect heat drying method for a particulate matter effectively.

The refined-coal production device of the present invention is a refined-coal production device, comprising:

a mixing means that mixes a particulate porous coal with an oil to yield a raw material slurry, a heating means that heats the raw material slurry to yield a dehydrated slurry, a solid/liquid separating means that separates the dehydrated slurry into a porous refined-coal and an oil, and a drying means that dries the separated porous refined-coal, wherein the drying means is the present indirect heat drying device.

The use of the refined-coal production device makes it possible to attain the refined-coal production method effectively.

Such a word "dry" as described herein denotes that the content by percentage of a liquid contained in a matter to be dried is decreased. This liquid is not limited to water. The wording "average particle diameter" denotes 50% cumulative average volume diameter (median diameter).

Advantageous Effects of Invention

As described above, according to the indirect heat drying method of the present invention for a particulate matter, the balance between pressures of a carrier gas therefor can be heightened in stability. As a result, the refined-coal production method of the present invention, in which this drying method is used, makes it possible to heighten refined-coal in productivity. Moreover, the indirect heat drying device and the refined-coal production device of the present invention

DESCRIPTION OF EMBODIMENTS

Hereinafter, referring appropriately to the drawings, a detailed description will be made about the indirect heat drying device, the indirect heat drying method, the refined-coal production device, and the refined-coal production method of the present invention.

<Indirect heat drying device>

Figure 1:
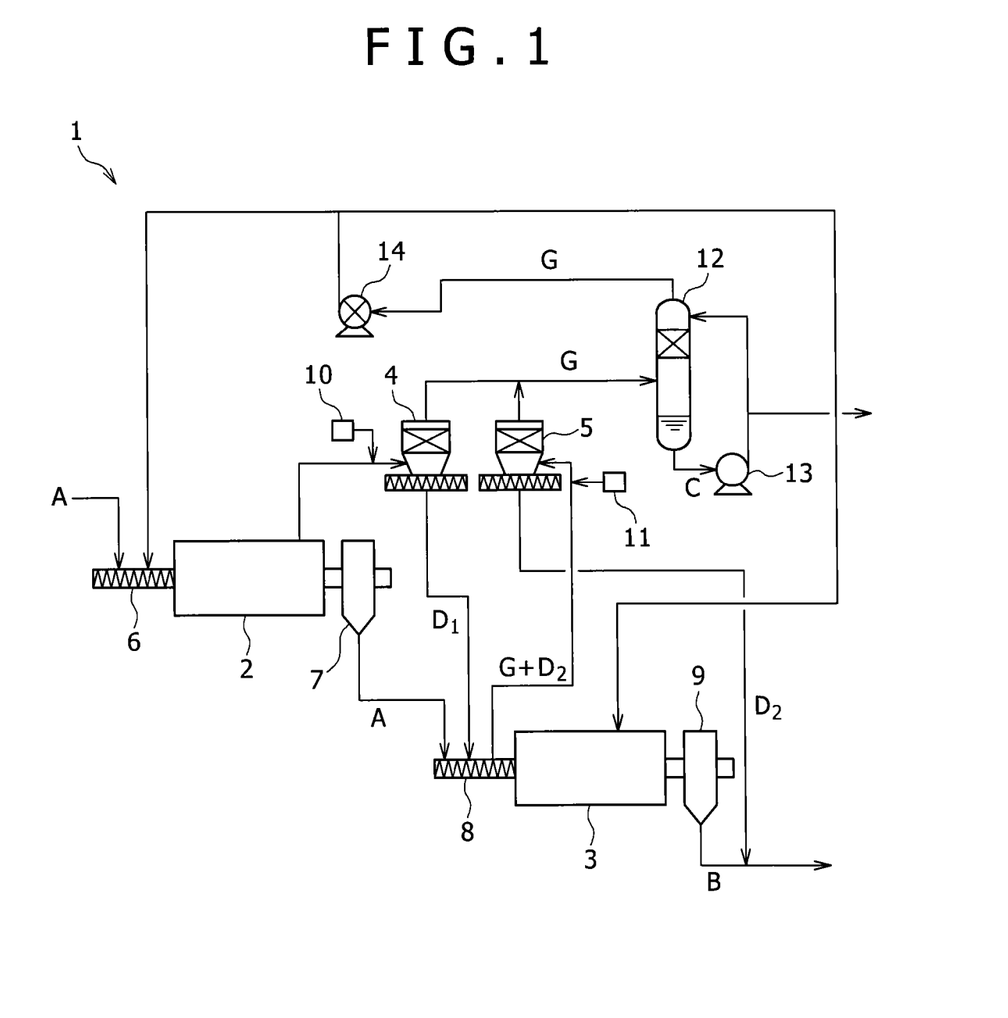
FIG. 1 is a schematic view illustrating an indirect heat drying device according to an embodiment of the present invention.

An indirect heat drying device 1 in FIG. 1 mainly has a first indirect heat drying unit 2, a second indirect heat drying unit 3, a first bag filter 4, and a second bag filter 5.

Figure 2:
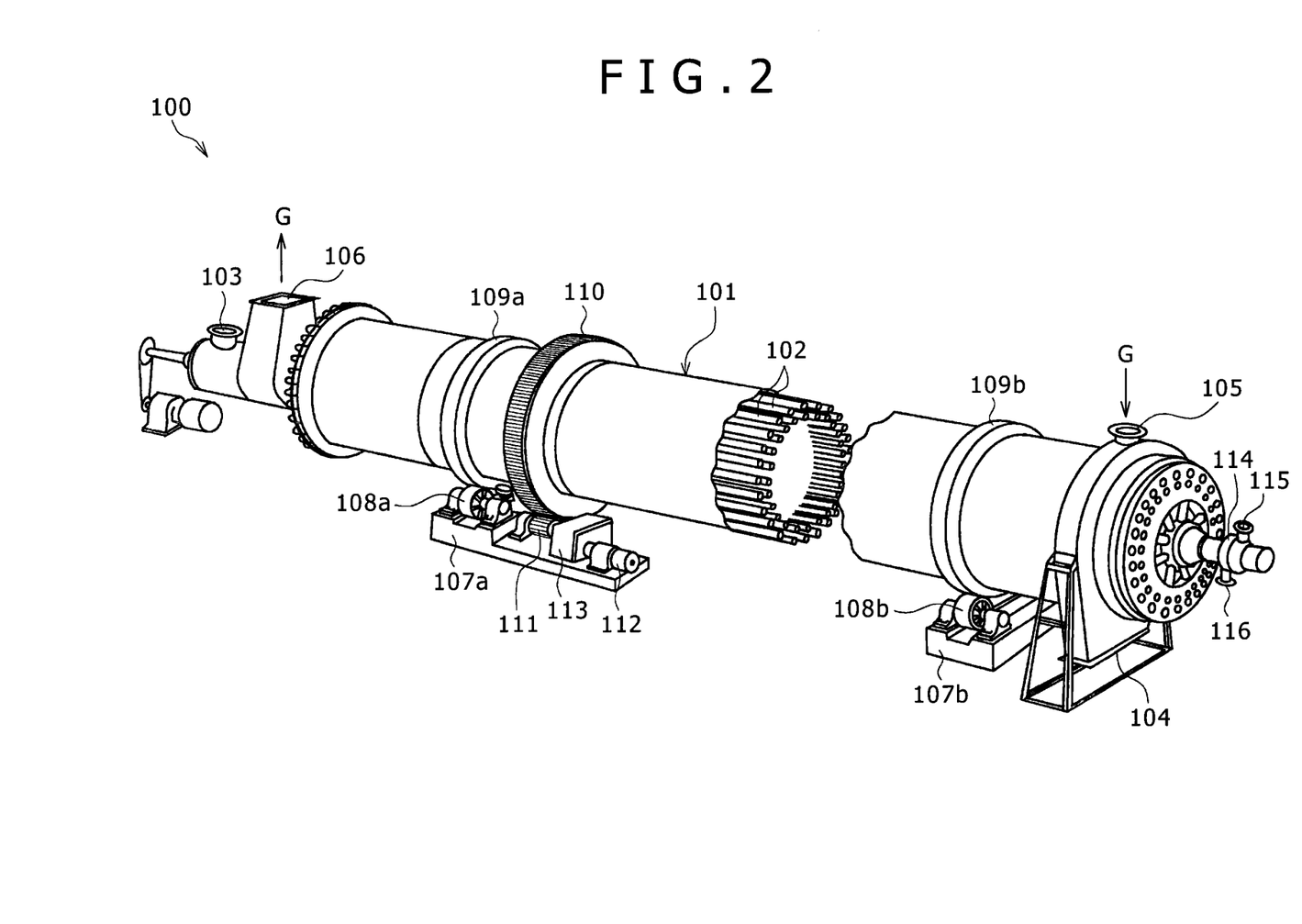
FIG. 2 is a schematic perspective view illustrating a steam tube drier which the indirect heat drying device in FIG. 1 has.

The first and second indirect heat drying units 2 and 3 may each be specifically a steam tube drier 100 illustrated in FIG. 2. The steam tube drier 100 mainly has a rotary cylinder 101, plural heating tubes 102, a supply port 103 and a discharge port 104 for a matter to be dried or a dried matter, and a carrier gas supply port 105 and a carrier gas discharge port 106 as a carrier gas passing means.

The dimensions of the steam tube drier 100 are not particularly limited. The length of the rotary cylinder 101 is generally from 5 m to 30 m both inclusive. Inside this rotary cylinder 101, a particulate matter that is a matter to be dried is brought into contact with the heating tubes 102 heated from the inside thereof through a heat medium. This steam tube drier 100 is formed to shift, successively and continuously, individual portions of the matter to be dried toward the discharge port 104. Accordingly, the rotary cylinder 101 is set to have a slight downgrade to shift the matter to be dried smoothly from the supply port 103 for the matter to be dried, which is positioned at an end of the cylinder, to the discharge port 104. The rotary cylinder 101 is supported, through rings 109a and 109b, on supporting rollers 108a and 108b that are located, respectively, on bases 107a and 107b that are positioned, respectively, at two points. The downgrade is adjusted in accordance with the heights and the angles of the bases 107a and 107b, and those of the supporting rollers 108a and 108b. In order to rotate the rotary cylinder 101, a follower gear 110 is located around the rotary cylinder 101. A driving gear 111 gears with this follower gear 110, and a rotating power of a prime mover 112 is transmitted through a speed reducer 113 to the follower gear 110, so that the rotary cylinder 101 comes to be rotated around its axis.

The many heating pipes 102 are arranged inside the rotary cylinder 101 to be parallel with the axis. A heated steam as a heat medium is supplied, through a heat medium inlet pipe 115 fitted to a rotary joint 114, to the heating pipes 102. This heated steam is passed into each of the heating pipes 102, and subsequently discharged through a heated medium outlet pipe 116.

An evaporated liquid component from the matter to be dried accompanies carrier gas G to be discharged to the outside of the rotary cylinder 101. Specifically, in the tube drier 100, carrier gas G is supplied from the supply port 105 at the dried-matter discharge side of the drier 100, and then discharged from the discharge port 106 at the matter-to-be-dried supply side thereof. In this case, the flow of carrier gas G is a counterflow against the flow of the matter to be dried.

In the tube drier 100, the supply port and the discharge port for the carrier gas may be made reverse to each other, that is, the carrier gas may be supplied in the reverse direction. In this way, the flow of the carrier gas can be rendered a co-current flow relative to the flow of the matter to be dried.

Carrier gas G is not particularly limited, and is appropriately selectable in accordance with the species of the matter to be dried, and others. When the matter to be dried is combustible, an inert gas such as $N_2$ is usable.

The first indirect heat drying unit 2 and the second indirect heat drying unit 3 are arranged in series in such a manner that the second indirect heat drying unit 3 can receive, as a matter to be dried for the second indirect heat drying unit 3, a dried matter obtained from the first indirect heat drying unit 2. The present indirect heat drying device is configured to supply the carrier gas as follows: in the first indirect heat drying unit 2, carrier gas G and the matter to be dried (particulate matter A) flow in the same direction (co-current flow); and in the second indirect heat drying unit 3, carrier gas G and the matter to be dried (particulate matter A) flow in directions reverse to each other (counterflow).

The first bag filter 4 and the second bag filter 5 are not particularly limited, and may be known bag filters. The first bag filter 4 functions as a first recovering means to recover first fine particles $D_1$ contained in carrier gas G discharged from the first indirect heat drying unit 2. The second bag filter 5 functions as a second recovering means to recover second fine particles $D_2$ contained in carrier gas G discharged from the second indirect heat drying unit 3.

The indirect heat drying device 1 further has a first mixing means and a second mixing means, which are not illustrated. In the first mixing means, first fine particles $D_1$ are mixed with particulate matter A to be supplied into the second indirect heat drying unit 3. In the second mixing means, second fine particles $D_2$ are mixed with a dried matter (dried particulate matter B) yielded from the second indirect heat drying unit 3. Each of the mixing means is not particularly limited as far as the mixing means is capable of mixing the above-mentioned two with each other. The mixing means may be an apparatus or instrument making it possible to transport fine particles, such as a sucking loader, a hopper loader, or a conveyer that may be of various types. The mixing means may be, for example, a pipe making use of a height difference. According to the "mixing" referred to herein, two species (fine particles and a particulate matter) may not be mixed into a homogenous state. Thus, it is sufficient for the two species to be turned into a state that the two species are present not to be separated from each other.

Other units and any other member that the indirect heat drying device 1 has will be described along the undermentioned description about the indirect heat drying method.

<Indirect Heat Drying Method>

The indirect heat drying method of the present invention makes use of two indirect heat drying units, and has the following steps:

step (A) of supplying a carrier gas into first one of the indirect heat drying units to produce a co-current flow relative to the flow of a particulate matter, thereby drying the particulate matter, step (B) of supplying the carrier gas into second one of the indirect heat drying units to produce a counterflow against the flow of the particulate matter, thereby drying the particulate matter further, step (C) of recovering first fine particles contained in the carrier gas discharged from the first indirect heat drying unit, and mixing the first fine particles with the particulate matter to be supplied to step (B), and step (D) of recovering second fine particles contained in the carrier gas discharged from the second indirect heat drying unit, and mixing the second fine particles with the dried particulate matter yielded through step (B).

Hereinafter, the indirect heat drying method will be described in detail about an example using the indirect heat drying device 1 in FIG. 1.

Step (A):

Particulate matter A, which is a matter to be dried, is supplied to the first indirect heat drying unit 2 through a screw conveyer 6. In the first indirect heat drying unit 2, carrier gas G is supplied into the first indirect heat drying unit 2 to produce a co-current flow relative to the flow of particulate matter A. Particulate matter A dried in the first indirect heat drying unit 2 is carried from a discharge casing 7 to a conveyer 8, and supplied into the second indirect heat drying unit 3 through the conveyer 8.

In this step, step (A), carrier gas G is supplied into the first indirect heat drying unit 2 from the particulate-matter-A supply side thereof. Inside the drying unit 2, carrier gas G captures an evaporated liquid component from particulate matter A, and dust (first fine particles $D_1$) involved by the drying of particulate matter A. Carrier gas G is discharged from the dried-matter (particulate-matter-A) discharge side of the first indirect heat drying unit 2.

Step (B):

Next, particulate matter A is further dried in the second indirect heat drying unit 3 to yield dried particulate matter B. In the second indirect heat drying unit 3, carrier gas G is supplied into the second indirect heat drying unit 3 to produce a counterflow against the flow of the particulate matter. Dried particulate matter B is discharged from a discharge casing 9, and then stored as required.

In this step, step (B), carrier gas G is supplied into the second indirect heat drying unit 3 from the dried-matter (dried-particulate-matter-B) discharge side of the unit 3. Inside the drying unit 3, carrier gas G captures an evaporated liquid component from the particulate matter, and dust (second fine particles $D_2$) involved by the drying of this particulate matter. Carrier gas G is discharged from the particulate-matter-A supply side of the second indirect heat drying unit 3.

Step (C):

Carrier gas G discharged from the first indirect heat drying unit 2 is sent to the first bag filter 4. In the first bag filter 4, first fine particles $D_1$ contained in carrier gas G are recovered.

In the indirect heat drying device 1, a $N_2$ plasma blaster 10 is fitted to the vicinity of an inlet of the first bag filter 4. This $N_2$ plasma blaster 10 makes it possible to remove dust (first fine particles $D_1$) adhering or depositing on the inlet of the first bag filter 4, and a pipe through which the first indirect heat drying unit 2 and the first bag filter 4 are connected to each other.

In the first mixing means not illustrated, recovered first fine particles $D_1$ are mixed with particulate matter A to be supplied to step (B). At this time, for example, first fine particles $D_1$ can be deposited onto, for example, the conveyer 8, through which particulate matter A is transported.

Additionally, between the first and second indirect heat drying units 2 and 3, a storing tank may be located in which particulate matter A is temporarily stored. First fine particles $D_1$ may be supplied into this storing tank. First fine particles $D_1$, with which particles different therefrom (i.e., particulate matter A) are mixed, are supplied together with particulate matter A into the second indirect heat drying unit 3.

Step (D):

Carrier gas G discharged from the second indirect heat drying unit 3 is sent to the second bag filter 5. In the second bag filter 5, second fine particles $D_2$ contained in carrier gas G are recovered.

In the indirect heat drying device 1, a $N_2$ plasma blaster 11 is fitted to the vicinity of an inlet of the second bag filter 5. This $N_2$ plasma blaster 11 makes it possible to remove dust (second fine particles $D_2$) adhering or depositing on the inlet of the second bag filter 5, and a pipe through which the second indirect heat drying unit 3 and the second bag filter 5 are connected to each other.

In the second mixing means not illustrated, recovered second fine particles $D_2$ are mixed with dried particulate matter B yielded in step (B). At this time, for example, below the discharge casing 9, a storing tank may be located in which particulate matter B is temporarily stored. Second fine particles $D_2$ may be supplied into this storing tank. Dried particulate matter B mixed with second fine particles $D_2$ is supplied to a subsequent step, as required.

Other steps:

Carrier gas G from which the dust (first or second fine particles $D_1$ or $D_2$) has been separated through one of the bag filters 4 and 5 is sent to a cooling tower 12 to be cooled. Coagulated liquid C generated by the cooling is discharged to the outside of the system through a pump 13. In the meantime, cooled carrier gas G is sent through a blower 14 to be again supplied to the first and second indirect heat drying units 2 and 3. A heater not illustrated is located between the blower 14, and each of the indirect heat drying units 2 and 3, so that carrier gas G can be heated to a predetermined temperature.

Advantageous effects:

According to the present indirect heat drying method for a particulate matter, in step (D), second fine particles $D_2$ contained in carrier gas G discharged from the second indirect heat drying unit 3 are mixed with dried particulate matter B yielded through step (B). This manner makes it possible to decrease the amount of second fine particles $D_2$ contained in carrier gas G discharged from the second indirect heat drying unit 3 to decrease the amount of second fine particles $D_2$ accumulating on the second bag filter 5 used to recover second fine particles $D_2$. Thus, according to the indirect heat drying method, the balance between pressures of carrier gas G inside the system can be heightened in stability. Second fine particles $D_2$ are relatively small in particle diameter, out of particles of dried particulate matter A; consequently, second fine particles $D_2$ have been sufficiently dried. Therefore, this indirect heat drying method is not substantially lowered in drying efficiency, as compared with conventional drying methods.

Furthermore, according to this indirect heat drying method, only once-separated second fine particles $D_2$ are treated so that treated second fine particles $D_2$ can be mixed with dried particulate matter B yielded through step (B). This treatment may be the spraying of a liquid (such as water) onto second fine particles $D_2$. This treatment makes it possible to restrain dust from being generated from the dried particulate matter to decrease the amount of the liquid used at this time.

Moreover, separated second fine particles $D_2$ may be mixed with an adhesive or some other, and then this mixture may be mixed with dried particulate matter B. This manner makes it possible to heighten the resultant dried matter (the mixture of the dried particulate matter and the second fine particles) in formability when the mixture is formed into a predetermined size. Furthermore, this manner makes it possible to decrease the use amount of the adhesive or the other used to heighten the formability.

It is preferred that the average particle diameter of second fine particles $D_2$ recovered in the second bag filter 5 (step (D)) is 10μm or less. Since the fine particles having such a particle diameter are relatively sufficiently dried in step (A), the indirect heat drying method can be restrained from being lowered in drying efficiency. The average particle diameter of second fine particles $D_2$ is adjustable, for example, by varying the mesh of the second bag filter 5. The average particle diameter is more preferably from 1 to 5μm both inclusive. If the average particle diameter of second fine particles D2 is less than this lower limit, it is necessary to make the mesh of the second bag filter 5 small, so that the balance between pressures of carrier gas G may be unfavorably deteriorated in stability.

The ratio by mass of second fine particles $D_2$ recovered in the second bag filter 5 (step (D)) to dried particulate matter B (step (B)) discharged from the second indirect heat drying unit 3 is preferably from 1/99 to 1/3 both inclusive, more preferably from 1/19 to 1/6 both inclusive. By separating second fine particles $D_2$ having a proportion in this range, the balance between pressure of carrier gas G can be improved in stability, and simultaneously the drying efficiency can be restrained from being lowered. If the proportion of second fine particles $D_2$ is less than the above-mentioned ratios, the carrier gas G pressure balance may be unfavorably made unstable by, for example, a matter that the amount of the fine particles remaining in the system is large. If the proportion of second fine particles $D_2$ is conversely more than the ratios, a relatively large amount of the fine particles do not pass through the second indirect heat drying unit 3, so that the drying efficiency may be unfavorably deteriorated. The ratio by mass of second fine particles $D_2$ to dried particulate matter B is controllable by adjusting, for example, the mesh of the second bag filter 5, or the amount of the carrier gas supplied into the second indirect heat drying unit 3.

The flow rate of carrier gas G in the second indirect heat drying unit 3 is not particularly limited, and is preferably from about 0.1 to 10 times both inclusive (by mole) the evaporation rate of the solvent in the second indirect heat drying unit 3. The adjustment of the flow rate into this range makes it possible to separate second fine particles $D_2$ into a desired amount while the particulate matter is sufficiently dried. It is also preferred to set, into the range of 0.1 to 10 $m^3/s \cdot m^2$ both inclusive, the flow rate of carrier gas G passing through the bag filters (the first and second bag filters 4 and 5) per filter area. This manner makes it possible to recover dust effectively through the bag filters.

In this indirect heat drying method, first and second fine particles $D_1$ and $D_2$ are recovered, using the respective bag filters. The use of the bag filters in this way makes it possible to recover a dust species having a desired particle diameter (the first or second fine particles) effectively. It is also unnecessary to conduct wastewater treatment, which is required for a wet scrubber and others.

Furthermore, in this indirect heat drying method, the generation of dew condensation of carrier gas G is restrained in each of the bag filter systems by supplying carrier gas G to produce a co-current flow relative to the flow of particulate matter A in step (A), and to produce a counterflow against that of particulate matter A in step (B). The reason therefor will be described hereinafter. In the first indirect heat drying unit 2, carrier gas G contains evaporated liquid components at the carrier-gas-outlet side of the drying unit 2, that is, at the dried-matter-outlet side thereof, and the dew point thereof is high. However, the drying of this dried matter (particulate matter A) has been advanced. Moreover, the temperature of this dried matter (particulate matter A) and carrier gas G has been become high. For this reason, the temperature difference between the gas temperature and the dew point can be made large so that dew condensation is not easily generated inside the first bag filter 4. In the meantime, in the second indirect heat drying unit 3, the matter to be dried (particulate matter A) has been dried up to a degree of the limit of a liquid content by percentage (in the matter) by effect of the first indirect heat drying unit 2, so that the temperature has been raised. For this reason, the temperature difference between the carrier gas temperature and the dew point can be made large; thus, dew condensation is not easily generated inside the second bag filter 5 fitted to the second indirect heat drying unit 3, either.

Furthermore, in the present indirect heat drying method and drying device 1, the cooling means (cooling tower 12) for carrier gas G and the heating means for carrier gas G are located in this order along the flow of carrier gas G. This manner makes it possible to lower the dew point of carrier gas G supplied to each of the indirect heat drying units 2 and 3.

According to the indirect heat drying method, dew condensation based on carrier gas G circulated in this way is restrained, so that dust (fine particles) can easily be restored through the bag filters 4 and 5. Moreover, the pressure balance is further restrained from being made instable by, for example, the clogging of the filters that is generated by dew condensation.

<Refined-coal Production Device>

The refined-coal production device of the present invention mainly has a mixing means, a heating means, a solid/liquid separating means, and a drying means.

The mixing means is a means for mixing a particulate porous coal with an oil to yield a raw material slurry. The mixing means is not particularly limited, and may be, for example, a known mixing tank having stirring winds or others.

The heating means is a means for heating the raw material slurry to yield a dehydrated slurry. The heating means is not particularly limited, and may be, for example, a known heat exchanger or vaporizer.

The solid/liquid separating means is a means for separating the dehydrated slurry into a porous refined-coal and an oil. The solid/liquid separating means is not particularly limited, and may be a known solid/liquid separator such as a centrifugal separator or a filter.

The drying means is a means for drying the separated porous refined-coal. The drying means is the above-mentioned indirect heat drying device.

Hereinafter, a description will be made about a method of using the refined-coal production device as a refined-coal production method.

<Refined-coal Production Method>

The refined-coal production method of the present invention has:

step (α) of mixing particulate porous coal with an oil to yield a raw material slurry (mixing step), step (β) of heating the raw material slurry to yield a dehydrated slurry (heating step), step (γ) of separating the dehydrated slurry into a porous refined-coal and an oil(solid/liquid separating step), and step (δ) of drying the separated porous refined-coal (drying step).

The method may further have a pulverizing step before mixing step (α), and a preheating step between mixing step (α) and heating step (β). Hereinafter, each of the steps will be described in detail.

Pulverizing Step:

In the pulverizing step, porous coal X is pulverized into a particulate matter having preferred particle diameters before the mixing step. The pulverization may be attained, using, for example, a known pulverizer. The particle diameters of the thus pulverized particulate porous coal to be supplied to the mixing step are not particularly limited, and may be, for example, from 0.05 to 2.0 mm both inclusive, preferably from 0.1 to 0.5 mm both inclusive.

Mixing Step (α):

In the mixing step, the above-mentioned mixing means is used to mix particulate porous coal X with an oil to yield a raw material slurry. This oil is preferably a mixed oil containing a heavy oil component and a solvent oil component. Hereinafter, an example using this mixed oil will be described.

The porous coal is the so-called low-quality coal, which contains a large proportion of water and is desired to be dehydrated. The water content by percentage in the porous coal is, for example, from 20 to 70% by mass. Examples of the porous coal include brown coal, lignite, and subbituminous coals (such as Samarangau coal).

The heavy oil component is an oil made of a heavy component which does not substantially show any vapor pressure even at, for example, 400° C., or an oil containing this heavy component in a large proportion; and may be, for example, asphalt.

The solvent oil component is an oil in which the heavy oil component is to be dispersed. This solvent oil component is preferably a low-boiling oil from the viewpoint of affinity with the heavy oil component, handleability as a slurry, high penetrability into pores, and others. Specifically, preferred is a petroleum oil having a boiling point of 100° C. or higher and preferably 300° C. or lower (such as light oil, kerosene or heavy oil).

In the use of such a mixed oil of a heavy oil component and a solvent oil component, this mixed oil shows an appropriate fluidity. Thus, in the present production method, the penetration of the heavy oil component into pores in the porous coal is promoted, the penetration being difficult to attain when only the heavy oil component is used. The content by percentage of the heavy oil component in the mixed oil may be set into the range of, for example, 0.25 to 15% by mass both inclusive.

The proportion of the blend of the mixed oil with the porous coal is not particularly limited. For example, the proportion by mass of the heavy oil component into the porous coal is from 0.5 to 30% by mass both inclusive, preferably from 0.5 to 5% by mass both inclusive.

Conditions in the mixing are not particularly limited. It is advisable to attain the mixing usually at a temperature of 40 to 100° C. under the atmospheric pressure.

Preheating Step:

Before the heating step, the raw material slurry yielded through the mixing step is usually preheated. Conditions for the preheating are not particularly limited. Usually, the slurry is heated to a temperature near the boiling point of water under the operating pressure.

Heating Step (β):

In the heating step, the above-mentioned heating means is used to heat the raw material slurry to yield a dehydrated slurry. At this time, the dehydration of the porous coal advances, and further the inside of the pores in the porous coal is impregnated with the mixed oil. Specifically, inner surfaces of the pores in the porous coal are successively coated with the mixed oil containing the heavy oil component, so that substantially entire regions of openings of the pores are filled with the heavy-oil-component-containing mixed oil. The heavy oil component in the mixed oil is selectively adsorbed onto their active points with ease, and further when the component adheres thereonto, the component is not easily separated therefrom. It is therefore concluded that the heavy oil component comes to adhere thereonto preferentially over the solvent oil component. The inner surfaces of the pores are blocked from the external air in this way, whereby the coal can be caused to lose natural ignitability. Additionally, a large proportion of water is removed by the dehydration, and further the heavy-oil-component-containing mixed oil, particularly, the heavy oil component comes to be preferentially filled into the pores; thus, the whole of the porous coal is increased in calorific value.

The heating is preferably performed under an increased pressure. The pressure is preferably, for example, from 200 to 1500 kPa. The heating period is not specified without reservation since the serial steps are usually carried out through a continuous operation. It is sufficient for the period to make it possible to attain the dehydration of the porous coal and the impregnation of the inside of the pores with the mixed oil.

Water vapor generated by the heating in the heating step is removed. The water vapor generated in the present step and then removed may be recovered. The recovered water vapor may be increased in pressure, and then used in the preheating step or the heating step.

Solid/Liquid Separating Step (γ):

In the solid/liquid separating step, the above-mentioned solid/liquid separating means is used to separate the dehydrated slurry into a porous refined-coal and a mixed oil. The mixed oil (oil components Z) separated in this step is reusable in the above-mentioned step, mixing step (α).

Drying Step (δ):

In the drying step, the indirect heat drying device 1 is used to dry the separated porous refined-coal. A specific method for the drying is as described above as the present indirect heat drying method for a particulate matter. The particulate matter, which is a matter to be dried, is the particulate porous refined-coal separated as described above.

Specifically, for example, in the first indirect heat drying unit, the oil components (particularly, the solvent oil component) are evaporated at a heating temperature of about 150 to 250° C. for a retaining period of about 30 to 120 minutes. Subsequently, in the second indirect heat drying unit also, oil components Z (particularly, the solvent oil component) are evaporated at a heating temperature of about 150 to 250° C. for a retaining period of about 30 to 120 minutes. Evaporated oil components Z are recovered to be reusable in mixing step (α).

Through this drying step, the liquid content by percentage in the porous refined-coal is adjustable from the range of 10 to 50% by mass to less than 10%, preferably a value of about 0.1 to 3%. If desired, dried porous refined-coal Y is cooled and formed into a shape. In this way, a refined-coal can be yielded.

In this step, drying step (δ) as step (D), second fine particles $D_2$ contained in carrier gas G discharged from the second indirect heat drying unit 3 are recovered, and the recovered particles are mixed with the dried particulate matter (porous refined-coal) yielded through step (B), as described above. This manner makes it possible to decrease the amount of second fine particles $D_2$ contained in carrier gas G discharged from the second indirect heat drying unit 3 to decrease the amount of second fine particles $D_2$ accumulating onto the second bag filter 5 or some other that is used to recover second fine particles $D_2$. Consequently, this production method makes it possible to heighten the stability of the balance between pressures of the carrier gas used in the drying step.

In the drying step, once-separated second fine particles $D_2$ may be subjected to a different treatment such as the spraying of water, or the blend of an adhesive. By mixing second fine particles $D_2$ subjected to this treatment with another porous refined-coal (dried particulate matter B), the generation of dust can be effectively restrained from the resultant refined-coal, and the refined-coal can be improved in formability when the coal is shaped into a briquette form.

WORKING EXAMPLE

Hereinafter, the present invention will be described in more detail by way of a working example thereof. However, the invention is not limited to the example.

Example 1

Figure 3:
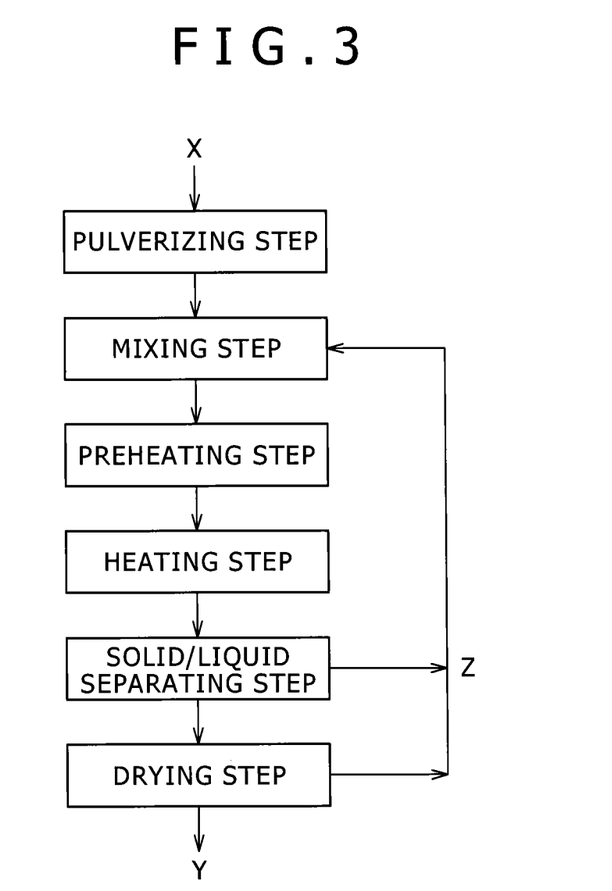
FIG. 3 is a flowchart showing a refined-coal production method according to an embodiment of the present invention.

The indirect heat drying device illustrated in FIG. 1 was used, and a continuous operation thereof was made along a flowchart in FIG. 3 under conditions described below to produce a refined-coal.
Pulverizing Step:
   Raw material: Samarangau coal
   Pulverizing conditions: maximum particle diameter: 3000 μm; average particle diameter: 150 μm
Mixing Step:
   A newly prepared mixed oil [1 kg/h of kerosene and 1 kg/h of asphalt] was supplied to 180 kg/h of Samarangau coal and 248 kg/h of a circulating oil to prepare a raw material slurry (at 70° C. and 100 kPa).
Heating Step:
   The supply rate of the raw material slurry into a heat exchanger (evaporator): 430 kg/h
   Heating conditions: 137° C. and 400 kPa
Solid/Liquid Separating Step:
   Conducted at 130° C. and 100 kPa
Drying Step:
   First drying unit: steam tube type drier (the number of tubes: 12, axial direction length: 5000 mm, and heating temperature (carrier gas ($CG_1$) temperature: about 210° C.); porous refined-coal retaining period: 60 minutes
   Second drying unit: steam tube type drier (the number of tubes: 6 (no steam was supplied to the remaining six tubes), axial direction length: 5000 mm, and heating temperature (carrier gas ($CG_2$) temperature: about 210° C.); porous refined-coal retaining period: 60 minutes
   Under these conditions, the production was performed. Just after the drying step, the refined-coal, which was porous, was yielded at a rate of 100 kg/h.

The liquid content by percentage in the resultant porous refined-coal was about 1% by mass.

The second fine particles recovered in the second bag filter had an average particle diameter (50% cumulative average diameter) of about 3μm. The ratio by mass of the recovered second fine particles to the dried particulate matter (refined-coal) discharged directly from the second indirect heat drying unit was about 1/9.

While the device was operated for 100 hours, a pressure gauge in the system, which was fitted to the second bag filter, stably showed a pressure in the range of 0.6 to 1.0 kPa.

Comparative Example 1

A refined-coal was produced in the same way as Example 1 except that in the indirect heat drying device in FIG. 1, a change was made to mix the dust (second fine particles) recovered in the second bag filter with the particulate matter to be supplied into the second indirect heat drying unit.

The liquid content by percentage in the resultant porous refined-coal was about 1% by mass.

While the device was operated for 100 hours, the value of the pressure gauge in the system, which was fitted to the second bag filter, was raised up to 1.6 kPa. Consequently, the amount of the gas circulated in the second indirect heat drying unit was decreased. Moreover, the use amount of $N_2$ was increased since the setup of a pulse for washing the bag filters was changed.

INDUSTRIAL APPLICABILITY

As described above, the indirect heat drying method of the present invention for a particulate matter is effectually usable for drying various particulate matters, for example, porous coal, sludge, food dregs and chemical agents, in particular, porous refined-coal.

EXPLANATION OF REFERENCES

1: Indirect heat drying device
2: First indirect heat drying unit
3: Second indirect heat drying unit
4: First bag filter
5: Second bag filter
6: Screw conveyer
7: Discharge casing
8: Conveyer
9: Discharge casing
10 and 11: $N_2$ plasma blaster
12: Cooling tower
13: Pump
14: Blower
100: Steam tube drier
101: Rotary cylinder
102: Heating tube
103: Supply port
104: Discharge port
105: Carrier gas supply port
106: Carrier gas discharge port
107a and 107b: bases
108a and 108b: Supporting rollers
109a and 109b: Rings
110: Follower gear
111: Driving gear
112: Prime mover
113: Speed reducer
114: Rotary joint 115: Heat medium inlet pipe
116: Heat medium outlet pipe
A: Particulate matter
B: Dried particulate matter
C: Coagulated liquid
$D_1$: First fine particles
$D_2$: Second fine particles
G: Carrier gas
X: Porous coal
Y: Porous refined-coal
Z: Oil components

The invention claimed is:

1. An indirect heat drying method for a particulate matter, using two indirect heat drying units each comprising a rotary cylinder located to be freely rotatable around an axis, plural heating tubes arranged inside the rotary cylinder to be parallel with the axis, and a carrier gas passing means that supplies a carrier gas from one out of two sides of the rotary cylinder to be discharged into the other side, the method comprising:
   step (A) of supplying the carrier gas into first one of the indirect heat drying units to produce a co-current flow relative to the flow of the particulate matter, thereby drying the particulate matter, and
   step (B) of supplying the carrier gas into second one of the indirect heat drying units to produce a counterflow against the flow of the particulate matter, thereby drying the particulate matter further, and
   the method further comprising:
   step (C) of recovering first fine particles contained in the carrier gas discharged from the first indirect heat drying unit, and mixing the first fine particles with the particulate matter to be supplied to step (B), and
   step (D) of recovering second fine particles contained in the carrier gas discharged from the second indirect heat drying unit, and mixing the second fine particles with the dried particulate matter yielded through step (B).

2. The indirect heat drying method for particulate matter according to claim 1, wherein the second fine particles recovered through step (D) have an average particle diameter of 10 μm or less.

3. The indirect heat drying method for particulate matter according to claim 1, wherein the ratio by mass of the second fine particles recovered in step (D) to the dried particulate matter yielded through step (B) is from 1/99 to 1/3 both inclusive.

4. A refined-coal production method, comprising:
   step (α) of mixing particulate porous coal with an oil to yield a raw material slurry,
   step (β) of heating the raw material slurry to yield a dehydrated slurry,
   step (γ) of separating the dehydrated slurry into a porous refined-coal and an oil, and
   step (δ) of drying the separated porous refined-coal,
   wherein in step (67), the indirect heat drying method for a particulate matter that is recited in claim 1 is used.

5. An indirect heat drying device, comprising a first indirect heat drying unit and a second indirect heat drying unit,
   each of the indirect heat drying units comprising a rotary cylinder located to be freely rotatable around an axis, plural heating tubes arranged inside the rotary cylinder to be parallel with the axis, and a carrier gas passing means that supplies a carrier gas from one out of two sides of the rotary cylinder to be discharged into the other side,
   the indirect heat drying device being arranged to receive a dried matter yielded from the first indirect heat drying unit as a matter to be dried in the second indirect heat drying unit, and
   the carrier gas passing means being a means that supplies the carrier gas into the first indirect heat drying unit to produce a co-current flow relative to the flow of a matter to be dried in the first indirect heat drying unit, and that supplies the carrier gas into the second indirect heat drying unit to produce a counterflow against the flow of the matter to be dried in the second indirect heat drying unit;
   the drying device further comprising:
   a first recovering means that recovers first fine particles contained in the carrier gas discharged from the first indirect heat drying unit,
   a first mixer that mixes the first fine particles with a particulate matter to be supplied into the second indirect heat drying unit,
   a recovering means that recovers second fine particles contained in the carrier gas discharged from the second indirect heat drying unit, and
   a second mixer that mixes the second fine particles with a dried matter yielded from the second indirect heat drying unit.

6. The refined-coal production device, comprising:
   a mixer that mixes a particulate porous coal with an oil to yield a raw material slurry,
   a heater that heats the raw material slurry to yield a dehydrated slurry,
   a solid/liquid separator that separates the dehydrated slurry into a porous refined-coal and an oil, and
   a drier that dries the separated porous refined-coal,
   wherein the drier is the indirect heat drying device recited in claim 5.

7. A refined-coal production method, comprising:
   step (α) of mixing particulate porous coal with an oil to yield a raw material slurry,
   step (β) of heating the raw material slurry to yield a dehydrated slurry,
   step (γ) of separating the dehydrated slurry into a porous refined-coal and an oil, and
   step (δ) of drying the separated porous refined-coal,
   wherein in step (δ), the indirect heat drying method for a particulate matter that is recited in claim 2 is used.

8. A refined-coal production method, comprising:
   step (α) of mixing particulate porous coal with an oil to yield a raw material slurry,
   step (β) of heating the raw material slurry to yield a dehydrated slurry,
   step (γ) of separating the dehydrated slurry into a porous refined-coal and an oil, and
   step (δ) of drying the separated porous refined-coal,
   wherein in step (δ), the indirect heat drying method for a particulate matter that is recited in claim 3 is used.

* * * * *